United States Patent [19]
Rosenberg et al.

[11] 3,846,565
[45] Nov. 5, 1974

[54] METHOD OF HEATING FROZEN FOOD USING SONIC OR ULTRASONIC WAVE ENERGY

[75] Inventors: Robert B. Rosenberg, Hinsdale; John D. Nesbitt; Mark E. Fejer, both of Chicago, all of Ill.

[73] Assignee: South Bend Range Corporation, South Bend, Ind.

[22] Filed: Aug. 3, 1972

[21] Appl. No.: 277,647

[52] U.S. Cl. ................ 426/238, 426/520, 426/524
[51] Int. Cl. ............................................. A23l 3/56
[58] Field of Search ......... 99/1, 100, 103, 107, 192, 99/193, 194, 217, 348; 426/238, 524, 520, 523, 393, 237, 241, 243

[56] References Cited
UNITED STATES PATENTS

| 2,344,754 | 3/1944 | Vang | 99/100 |
| 2,881,079 | 4/1959 | Simjian | 99/217 |
| 2,886,439 | 5/1959 | Eytinge | 99/217 |
| 2,918,380 | 12/1959 | Wearmouth | 99/217 |
| 3,008,837 | 11/1961 | Kaplan | 99/192 |
| 3,056,877 | 10/1962 | Schmidt | 99/100 |
| 3,212,756 | 10/1965 | Hutton | 99/217 |
| 3,336,442 | 8/1967 | Lawson | 99/217 |
| 3,394,007 | 7/1968 | Campbell | 99/1 |
| 3,636,859 | 1/1972 | Null | 99/217 |

Primary Examiner—Norman Yudkoff
Assistant Examiner—Martin G. Mullen
Attorney, Agent, or Firm—Oltsch & Knoblock

[57] ABSTRACT

A method of heating frozen foods in which the food is placed in a heated medium, such as boiling water or heated oil, and vibratory wave energy in the sonic or ultrasonic range is directed through said heated medium and against the food to accelerate the heating of the food to an elevated temperature.

8 Claims, 2 Drawing Figures

METHOD OF HEATING FROZEN FOOD USING SONIC OR ULTRASONIC WAVE ENERGY

BACKGROUND OF THE INVENTION

This invention relates to a method of heating frozen food and will have specific, but not limited, application to the reheating of precooked frozen foods.

With the advent and perfection of methods of quick freezing foods, it is now possible to obtain frozen precooked foods wrapped in suitable containers, such as pliofilm bags, which need only to be reheated by cafeteria, restaurant or food service operators for serving. Such quick frozen foods maintain a high quality of tastefulness and permit the restaurant, cafeteria or food service operator to better regulate and control his food inventory and to conserve and make better use of his kitchen area and the equipment therein. Various means for reheating the precooked frozen food at the food service facility have been developed. These methods consist of using microwave energy, forced convection heating in gas fueled ovens, and radiant heating utilizing both electric heating elements as well as radiant gas burners. Each of these methods of reheating precooked frozen foods have one or more deficiencies when attempts are made to reheat frozen food which is packaged for cafeteria, restaurant, hospital and hotel use in blocks or packages weighing 2½ pounds or more. Until the development of the improved method of this invention steam ovens had been the quickest means to reheat the larger food packages to serving or eating temperature while maintaining adequate taste quality.

SUMMARY OF THE INVENTION

This invention relates to an improved method of heating frozen food and includes the steps of providing a heated medium, such as water or oil; exposing the frozen food to such heated medium; and directing vibratory wave energy against the frozen food while in the heated medium for the purpose of accelerating the heating of the food.

Accordingly, it is an object of this invention to provide a method of heating frozen foods through the use of vibratory wave energy.

Another object of this invention is to provide a method of reheating frozen precooked food through the use of sonic and ultrasonic energy.

Another object of this invention is to provide a method for reheating bulk frozen foods in a minimum of time.

Still another object of this invention is to provide a method of reheating frozen precooked foods through the use of boiling water and ultrasonic energy.

And still another object of this invention is to provide a method of reheating frozen precooked foods through the use of hot oil and ultrasonic energy.

Other objects of this invention will become apparent upon a reading of the invention's description.

DESCRIPTION OF THE PREFERRED EMBODIMENTS

The preferred embodiments hereinafter described are not intended to be exhaustive or to limit the invention to the precise forms disclosed. They are chosen and described in order to best explain the principles of the invention and its application and practical use to thereby enable others skilled in the art to best utilize the invention.

The problem of reheating frozen foods to which the method of this invention is directed can best be understood by an examination of the thawing process. In heating the frozen food to a serving or eating temperature of approximately 180 degrees Farenheit, the food package which includes a surrounding heat transferable container and which is generally held at approximately 0 degrees F to inhibit spoilage, is first warmed to 32 degrees F where melting occurs. The energy required to warm the frozen food to 32 degrees F is approximately 15 BTU's for each pound of food. Approximately 140 BTU's for each pound of frozen food, known generally as the latent heat of fusion, is required to melt or thaw the frozen food after it has reached a temperature of 32 degrees F. After the food has been thawed at 32 degrees F, it is then heated to a temperature of approximately 180 degrees F which requires approximately 150 BTU's per pound of frozen food. This heating process does not occur in distinct steps, but rather in a combination of steps during which the core of the frozen food package is being warmed to 32 degrees F while the outer layer of the food package is being heated from 32 degrees to 180 degrees F and an intermediate portion of the package between the outer layer and core of the package is being thawed at 32 degrees F. Because of this combination of heating steps, all heat reaching the still frozen core of the food package must first pass through the melted and thawing outer and intermediate layers of food. The thawing intermediate food layer, even though liquid, is substantially stagnant at the outer surface of the frozen food core and serves to partly insulate the frozen core from the heat. In this invention, vibratory wave energy is directed against the frozen food package to cause agitation of the thawed liquid portions of the intermediate layer of food, thus increasing its heat conductive qualities and thereby reducing the time to thaw the entire frozen food package and bring it to serving or eating temperature.

Figure 1:
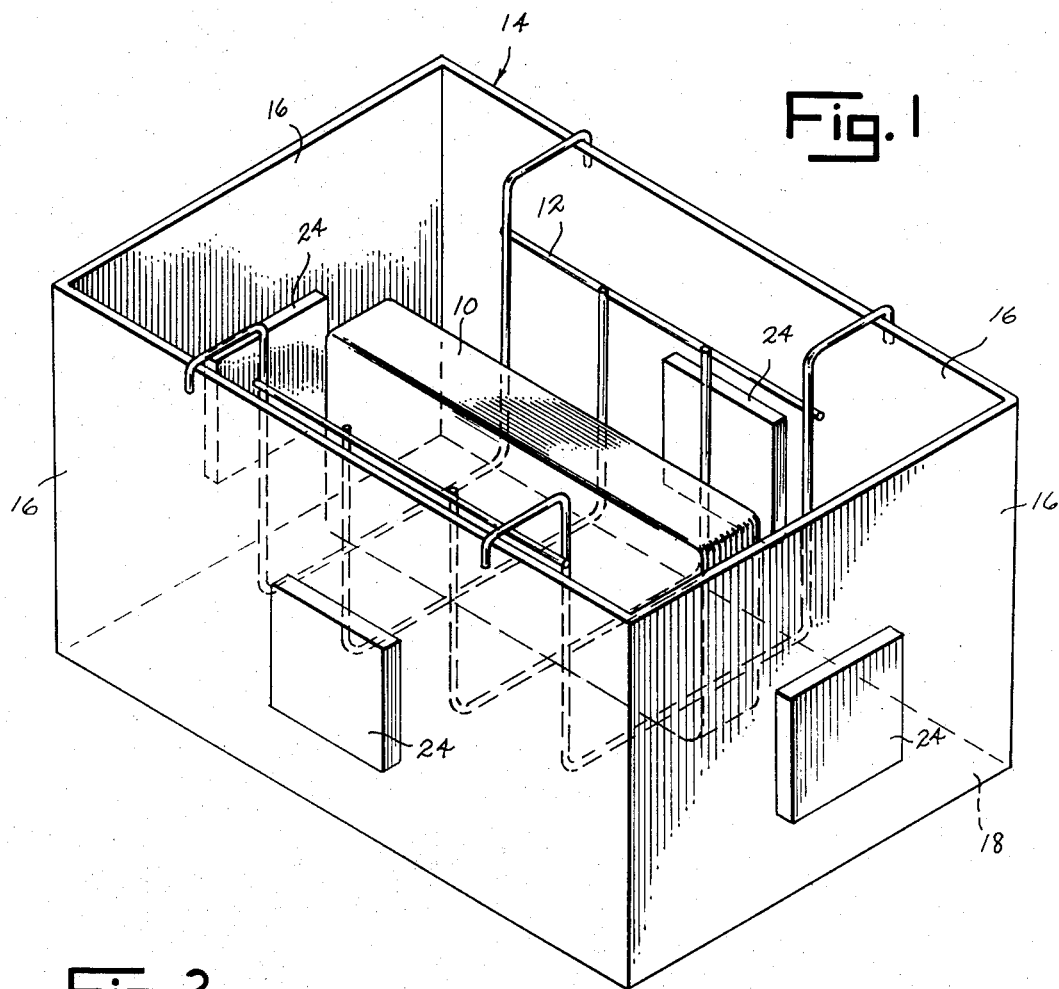
FIG. 1 is a perspective view of apparatus which can be used to practice the method of this invention.
Figure 2:
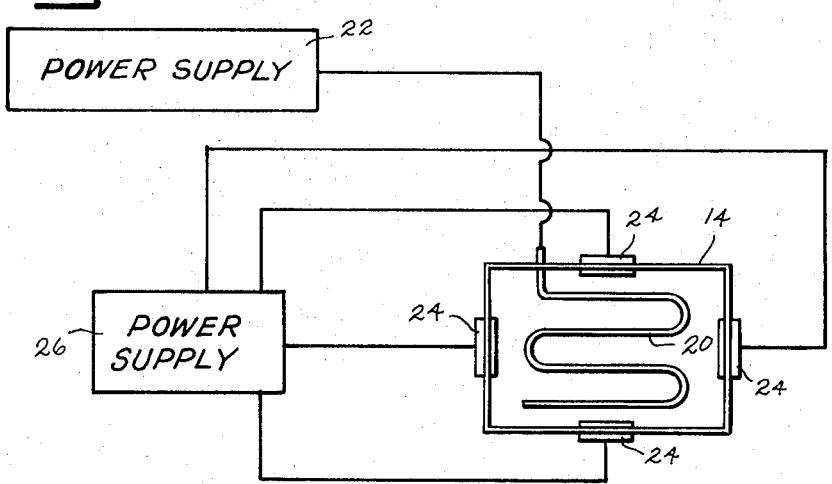
FIG. 2 is a schematic view of the apparatus of FIG. 1 showing the power supply units for operating the apparatus.

A frozen food package 10 may be supported by a wire holder 12 in a container 14. Container 14 includes side walls 16 and a bottom wall 18. Container 14 is filled with a medium such as water or oil which is heated by a suitable heat source such as either gas burners (not shown) or electrical heater coils 20 (shown in FIG. 2) and supported upon container bottom wall 18. Coils 20 are suitably insulated and are powered by an electrical power supply 22. Coils 20 serve to heat the medium within container 14 to a selected temperature which is preferably above the 170 to 180 degree F serving or eating temperature for the food.

Mounted to at least one and preferably each side wall 16 is a transducer 24 for producing vibratory wave energy in the sonic or ultrasonic range. Transducers 24 are operatively connected to a suitable electrical power generation source 26. During actuation of transducers 24, the wave energy emitted from the transducers is directed against frozen food package 10 submerged within the heated medium within container 14. This wave energy causes agitation of the thawed liquid portions of the food as the food package is being heated by the heated medium, thereby increasing the heat transfer to the frozen core of the food package. In some applications of this invention it may be preferable to use a bottom-mounted transducer singularly or in combination with the above mentioned side-mounted transducers 24.

It has been found that in submerging a 2½ pound package measuring 8 × 10 × 2 inch of precooked frozen lima beans wrapped in pliofilm in a heated medium which consisted of boiling water and directing ultrasonic wave energy against opposite sides of the food parcel by means of two opposed container side wall mounted transducers rated at 50 kHz and 250 watts, the food package which included the food contents was heated from 0 degrees F to a serving temperature of approximately 180 degrees F within a period of 8 to 10 minutes. Additionally, it was found that when the wave energy was directed against the ends of the package of frozen beans, the package was heated from 0 degrees F to approximately 180 degrees F in 8 to 12 minutes. Also, tests were conducted by moving the frozen package of lima beans within the boiling water while continuously subjecting it to the aforementioned ultrasonic wave energy. In these last mentioned tests it was found that the time required to heat the moving 2½ lb. package of frozen lima beans from 0 degrees F to 180 degrees F was approximately 8 to 10 minutes.

Additional tests were conducted using 6 × 6 × 6 inches and 6 × 6 × 2 inch packages of frozen precooked brussel sprouts and lima beans. In heating these packages from 0 degrees F to 160 and 180 degrees F in boiling water and subjecting the packages to ultrasonic wave energy of 20 and 40 kHz, there was a 15 to 30 percent decrease in the time it took to reheat the frozen packages to the same temperatures without the use of ultrasonic wave energy. In further testing of 6 × 6 × 2 inch packages of frozen precooked brussel sprouts and lima beans, the frequency level of the ultrasonic wave energy was increased to 72, 250, and 570 kHz, with a resulting 40 to 50 percent decrease in the time it took to reheat the frozen packages to the same temperature without ultrasonic wave energy. These latter frequency variation tests indicate that ultrasonic frequencies above 100 kHz are preferred to accelerate the reheating of precooked frozen foods. Also the use of directional transducers provided better reheating results.

It is anticipated that different heated mediums can be utilized for heating the frozen foods. Additional testing has disclosed that cooking oil or similar liquid frying shortening heated to between 330 and 400 degrees F can be utilized in conjunction with ultrasonic wave energy for reheating frozen pre-french-fried foods or for cooking foods.

It is to be understood that the invention is not to be limited to the details above given but may be modified within the scope of the appended claims.

What we claim is:

1. A method of heating a frozen food comprising the steps:
   a. providing a heated medium;
   b. exposing said food to said heated medium; and
   c. directing vibratory wave energy in the sonic or ultrasonic range through said heated medium and against said food to assist said heated medium in reheating said food to an elevated temperature.

2. A method of heating a package of frozen food comprising the steps:
   a. providing a liquid medium heated to a temperature above that of said food package;
   b. submerging said food package in said liquid medium; and
   c. directing vibratory wave energy in the sonic or ultrasonic range against said submerged food package to accelerate the heating thereof by said liquid medium.

3. The method of claim 2 wherein said food package has been precooked; said step (a) including providing a liquid medium heated to a temperature of at least 170 degrees F; said step (c) including directing said vibratory wave energy through said liquid medium and against said submerged food package to accelerate the heating of the package to a temperature of at least 170 degrees F.

4. The method of claim 3 wherein said liquid medium is water and step (a) includes heating said water to its boiling temperature.

5. The method of claim 4 wherein the vibratory energy in step (c) is ultrasonic energy.

6. The method of claim 4 wherein the vibratory energy in step (c) is sonic energy.

7. The method of claim 2 and including the step of moving said food package within said liquid medium as said package is subjected to said vibratory wave energy.

8. The method of claim 2 wherein step (a) includes providing an oil heated to a temperature of at least 330 degrees F and step (c) includes directing said vibratory wave energy through said oil and against said submerged food package.

* * * * *